J. H. MAXWELL.
KNOCKDOWN RAFT.
APPLICATION FILED OCT. 22, 1914.

1,151,115.

Patented Aug. 24, 1915.
2 SHEETS—SHEET 1.

WITNESSES

George L. McElwain
J. E. Prouty

INVENTOR.
James H. Maxwell.
By Henry L. Reynolds
Attorney

J. H. MAXWELL.
KNOCKDOWN RAFT.
APPLICATION FILED OCT. 22, 1914.
1,151,115.
Patented Aug. 24, 1915.
2 SHEETS—SHEET 2.
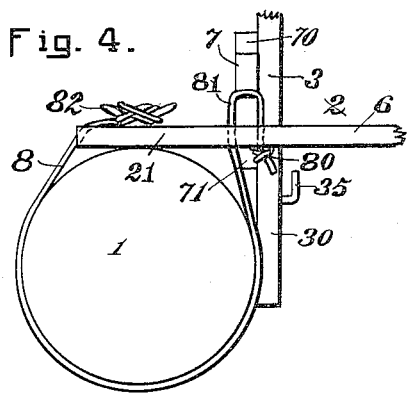
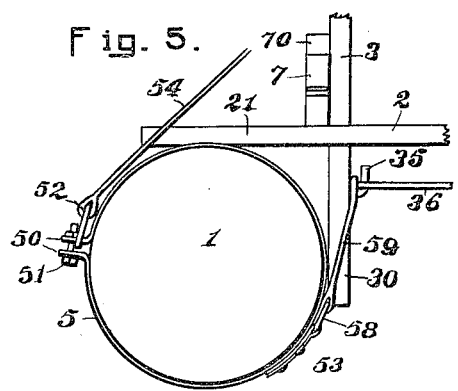
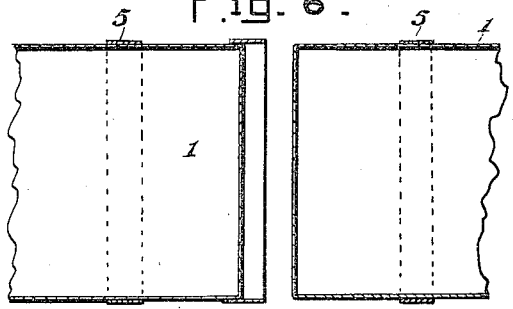
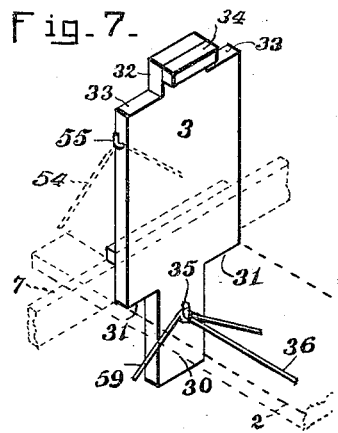
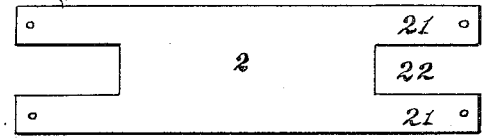
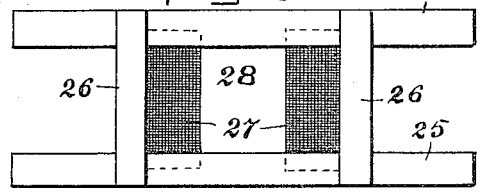
WITNESSES.
Penzo L McElwain
J. E. Prouty
INVENTOR.
James H. Maxwell.
By Henry L. Reynolds.
Attorney.

UNITED STATES PATENT OFFICE.

JAMES H. MAXWELL, OF SEATTLE, WASHINGTON.

KNOCKDOWN RAFT.

1,151,115. Specification of Letters Patent. Patented Aug. 24, 1915.

Application filed October 22, 1914. Serial No. 868,778.

*To all whom it may concern:*

Be it known that I, JAMES H. MAXWELL, a citizen of the United States, and resident of the city of Seattle, King county, Washington, have invented certain new and useful Improvements in Knockdown Rafts, of which the following is a specification.

My invention relates to rafts or floats which are designed to be taken apart or disassembled for transportation or storage and hence I have called it a knock down raft.

The object of my invention is to provide a float or raft which may be readily assembled or dis-assembled and which, when assembled, will form a convenient float for fishing and other purposes, and which may be taken apart into pieces of such size as will permit convenient storage and transportation. It is also designed that the raft when completed and assembled, shall be provided with means whereby it may be propelled and with other minor conveniences for its use for fishing and other purposes.

The novel features of my invention will be hereinafter described and particularly pointed out in the claims.

In the accompanying drawings I have shown my invention in the form of construction which is now preferred by me, while at the same time being aware that many details of construction may be more or less varied without making the same essentially different in principle from those shown.

Figure 1:
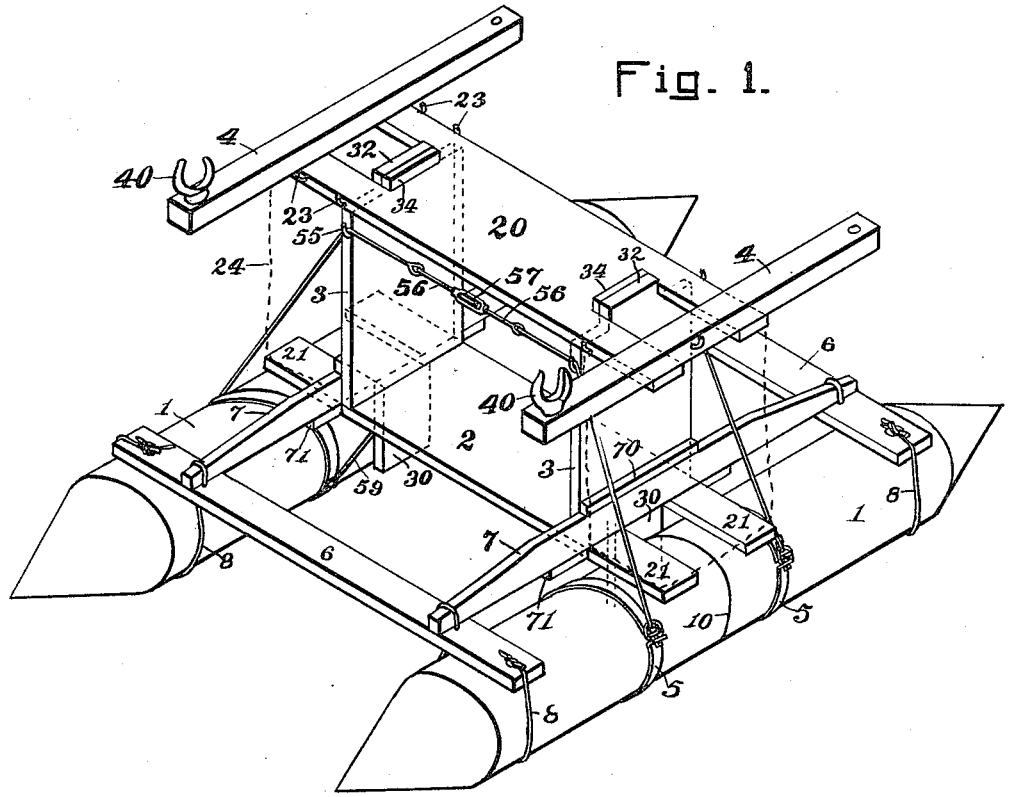
Figure 3:
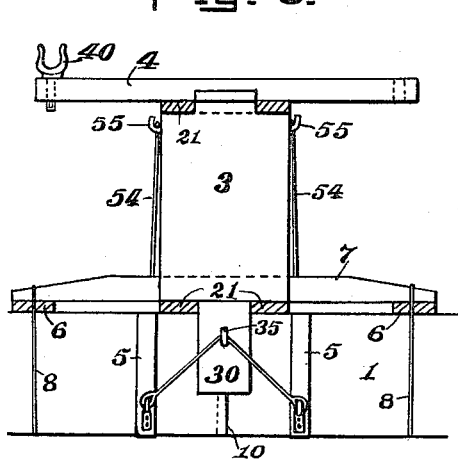
Figure 2:
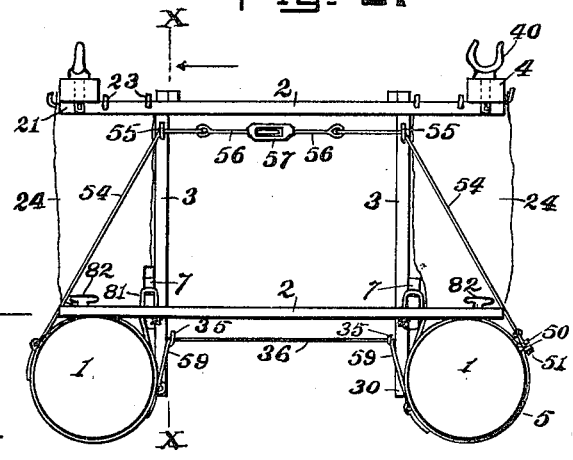

Figure 1 shows the assembled raft in perspective. Fig. 2 shows an end view of the raft. Fig. 3 is a side elevation taken in section just inside one of the seat supporting standards, looking outwardly, as upon the line X, X, of Fig. 2. Fig. 4 is an end view of a pontoon showing the manner of securing the cross bars at their ends. Fig. 5 is a like view showing the central bands upon the pontoons. Fig. 6 illustrates the joint which it is preferred to use in securing the two sections of a pontoon. Fig. 7 shows in perspective one of the seat supporting standards, certain other parts being indicated by dotted lines. Fig. 8 shows the two horizontal members of the frame, one of which forms the seat and the other rests upon the pontoons, the construction being that shown in Fig. 1. Fig. 9 shows a modified construction which may be used for the horizontal member which rests upon the pontoons.

The floating capacity of this raft is contained in two pontoons, 1, which are placed alongside each other, but separated a sufficient distance to give the raft the desired stability. Each of these pontoons are preferably made of two sections, these joining by engagement of their ends, beneath the seat. The line of junction is shown in Fig. 1 at 10.

The kind of joint used here is immaterial, so that it properly answers the purpose of holding the pontoon sections in alinement. A simple type of joint which I have found to be satisfactory, when used in conjunction with other parts of my construction, is shown in Fig. 6, which shows the abutting ends of the two pontoon sections in section and slightly separated. This consists in providing one end with a narrow flange 11, which makes a shallow socket into which the end of the other section fits snugly. It may be remarked that reliance is not placed upon this joint to prevent separation of the pontoon sections, this being provided for in other ways.

The principal portion of the connecting frame consists of a bottom board 2, a seat board 20, both of which are horizontal and essentially alike, and two seat supporting standards 3. These four members are interlocked so as to connect the pontoons and form a seat structure. This structure is secured together by tension members which also bind the pontoons thereto.

In Fig. 8 one of the horizontal members of this frame structure is shown separately from the other parts. It consists essentially of a board having a notch deeply cut in each end to form a central recess or socket for the reception of the downwardly extending tongue of the seat standards. These features are also possessed by the seat 20. The side bars or tongues 21, lying at each side the recess 22, rest upon the top of the pontoon, in the lower member, and in the upper member, form a support for the longitudinal bars 4, upon which the oar locks are mounted.

The seat supporting standards 3, have a central tongue 30, which fits snugly into the recess 22 of the bottom board 2, and is long enough to extend downward so as to engage the side surface of the pontoon. The shoulders 31 at each side of tongue 30, rest upon the upper surface of the bottom board 2 and sustain the standard.

At their upper ends, the standards are provided with a central tongue 32, which is essentially like the tongue 30, except that it is much shorter, projecting but little above the upper surface of the seat board 20. This tongue fits the recesses in the ends of the seat boards. At one side a cleat 34 is secured, so that it will fit down upon the upper surface of the seat board when the parts are assembled. It thus prevents the seat from raising so long as the standards are held in proper place.

On the inner side of the tongue 30, means are provided to which to secure a tension member so as to connect the two tongues of opposite standards, thereby preventing their separation. The means shown consists of hooks 35. The connecting tension member consists of a cord, wire or rod, 36, which may be provided with take-up means if thought desirable.

About each section of the pontoons, near their abutting ends, are placed hoops or bands 5. These, in the construction shown, have ends 50 bent outward and perforated to receive a clamping bolt 51. Beneath this bolt a ring 52 is placed, to which is secured the end of a tension member which binds the frame and seat structure together.

The above structure is only that which I prefer now to use. It may be replaced by any suitable device whereby the tension member 54 may be properly secured to the pontoon.

The tension binding and securing member 54, extends upwardly and is supported in elevated position from the standards 3, as by a hook 55, and thence extends across to the other standard, over another hook 55, and thence downward to a like connection with the other pontoon. This member should be provided with means whereby the same may be tightened, I have shown it as having rods 56 and turnbuckle 57 in the horizontal parts lying between the hooks 55.

At the inner side of the pontoon, the band 5 has secured thereto, a loop 53, which has a ring 58 therein, to which one end of a short tension member 59 may be connected. This connecting member extends to and is connected with the like ring 58 carried by the other section of the pontoon. The central part of this tension member 59, is placed over the hook 35, or in any other convenient manner supported from the tongue 30 of the seat standard. When the main tension members 54 are tightened, the pontoon will be turned, or rolled, which will tighten the tension member 59 on the inside of the pontoon. This latter member 59, thus acts to resist the turning of the pontoon and also to draw the two sections of the pontoon together.

At each end of the pontoons, a cross bar 6 is preferably placed to connect the two pontoons. These cross bars 6 bear upon the top of the pontoons and are secured under the ends of two longitudinally placed bars 7, which are supported in fixed position on the main frame. The method of doing this shown and now preferred by me, is to place the bar 7 against the outer side surface of the standard 3 and bearing upon the upper surface of the bottom board 2. Secured to the side of the standard 3 where it will engage snugly with the upper edge surface of the bar 7, is a cleat 70, which binds the two together, so far as vertical movements. I also preferably secure lugs or blocks 71 to the under edge of the bar 7, in position such that they will engage the edges of the board 2 and prevent lengthwise movement of the bar 7.

The cross bars 6 are provided with holes, located at each side of the position occupied by the ends of the bars 7, through which passes a cord 8, so as to form a loop which embraces the end of the bar 7, to thereby bind the bars 6 and 7 securely against separation by movements lengthwise the bars 6. I also prefer that the bar 7 be slightly grooved at this point, so that the cord will seat itself in the groove, which will prevent movement in the other direction and prevent the cord from being slipped off the end of the bar 7.

The cord 8, after passing through the bar 6, passes about the pontoon and is brought to the outer end of the bar 6, where it is secured in any convenient and secure manner. For this purpose I have shown a small cleat 82. The purpose of the above parts is to secure the bars 6 and 7 together and to the pontoon. Other means for doing this might be employed. The cross bars 6 form a convenient foot rest, as well as a connection between the pontoons. By their use, in connection with the main frame, bearings are supplied at four places in the length of the pontoons.

Longitudinally extending bars 4, secured to the outer ends of the tongues 21 of the seat board, may be provided and have holes in their ends for the reception of oar locks 40. This enables oars to be used with which to propel the raft. The pontoons are of such shape that they will offer little resistance and the raft may be propelled with little labor.

I have shown small hooks 23 secured in the outer side edge of the tongues 21, and also on the outer edge surface of the bars 4. One may also be placed upon the upper end of the tongue 32 or the seat standard. The purpose is to place a number of hooks disposed about the opening between the tongues 21, bar 4 and the standard, upon which a bag may be suspended, in which may be placed various articles so that they will be secure against loss and yet be readily accessible. The hole between the tongues 21 and bar 4, will open directly into a bag suspended in this manner. I have shown such a bag by dotted lines in Fig. 1 and by full lines in Fig. 2.

In Fig. 9 I have shown a modified construction for the bottom board of the main frame. In this case two narrow boards 25 are used, separated at a greater distance than the tongues 21, and secured together by bars 26 which take the place of the central section of the board 2. The seat standards rest upon these cross bars 26.

Connecting the parallel bars 25, are two canvas strips 27, these being separated sufficiently, as are also the bars 25, to make an opening between them large enough to admit a man's head. When the device is placed over a man's head in this manner, the canvas strips 27 rest upon his shoulders and carrying the raft is made easy. While the raft is rather heavy and awkward for one man to carry without some special provision, it is conveniently handled from place to place on land, by the above expedient.

What I claim and desire to patent is:

1. In a knock-down raft, in combination, two pontoons and a connecting frame comprising a base board adapted to bear upon the pontoons when spaced apart and provided with sockets for seat standards, seat standards having ends entering said sockets and extending downward and lying against the inner sides of the pontoons, a seat board having an interlocking engagement with the upper ends of the standards maintaining the spacing therebetween, members connecting the lower ends of the standards with the pontoons and a flexible member connected by its ends with the outer sides of the pontoons and supports for the intermediate parts of said flexible member carried by the standards.

2. In a knock-down raft, in combination, two pontoons, an interlocking frame connecting and maintaining the pontoons in spaced relation and comprising two vertical members, an elevated seat board connecting the upper ends of these vertical members, and bars carried by and projecting transversely from the ends of the seat board and carrying oar-locks at their outer ends.

3. In a knock-down raft, in combination, two pontoons, a frame connecting and maintaining the pontoons in spaced relation and comprising a base board having its ends resting upon the pontoons and provided with sockets in line with the inner sides of the pontoons, seat standards having tongues passing through said sockets and engaging the inner sides of the pontoons, a seat board having sockets located similarly to those in the base board, the standards having upwardly extending tongues entering said sockets in the seat board, means for connecting the tongues at the lower ends of the seat standards with the pontoons, tension members connected by their ends with the outer sides of the pontoons, supports for the intermediate parts of said flexible members carried by the seat standards near their upper ends, and means for tightening said flexible members.

4. A knock-down raft comprising two pontoons, each composed of two sections having their ends abutting, a connecting frame bearing upon the pontoons at each side of the joint between the sections, tension members connecting the sections of each pontoon and lying at the inner side of the pontoons, supports for the intermediate parts of said tension members carried by the connecting frame, tension members connected by their ends with the outer sides of opposite pontoons, the connecting frame having elevated supports for the intermediate parts of said latter tension members.

5. A knock-down raft comprising two pontoons, each composed of two sections having their ends abutting, a connecting frame extending between said pontoons, a tension member connecting the sections of each pontoon, an intermediate support for said tension member carried by the connecting frame, and means for turning the pontoons to tighten said tension members.

6. A knock-down raft comprising two pontoons, a connecting frame having members engaging the inner side and tops of the pontoons and an elevated seat member, means for connecting the pontoons to the frame members lying at the side of the pontoons, tension members connected by their ends with the outer sides of the pontoons, elevated supports for the intermediate parts of said tension members carried by the frame, and means for tightening said tension members.

7. A knock-down raft comprising two pontoons, a connecting frame comprising a base board resting upon the pontoons, seat standards carried upon said base board and having downward extensions engaging the inner sides of the pontoons, means for securing the pontoons to the downward extensions of the seat standards, tension members having their ends connected with the outer sides of the pontoons, elevated supports for said tension members carried by the seat standards, and means for tightening said tension members.

8. A knock-down raft comprising two pontoons and a connecting frame, said frame comprising a horizontal compression member resting upon the pontoons and having end-facing shoulders in line with the inner sides of the pontoons, two standards engaging said end facing shoulders and resting upon said horizontal member, and having downward extensions engaging the inner side surfaces of the pontoons, a tension member connecting said downward extensions, means connecting said downward extensions with the pontoons to resist turning of the latter, tension members connected by their ends with the outer sides of the pontoons, elevated supports for the intermediate parts of said tension members carried by said standards, and a take-up device incorporated in the intermediate parts of said tension members.

9. A knock-down raft comprising two pontoons, a connecting frame comprising a base member having its ends bearing upon the pontoons and having outwardly facing shoulders in line with the inner sides of the pontoons, seat supporting standards having shoulders resting upon the base member and downward extensions bearing against the outwardly facing shoulders of the base member and against the inner sides of the pontoons, and also having upward extensions of reduced width providing seat supporting shoulders, a seat having sockets for the reception of said upward extensions and resting upon the adjoining shoulders, said upward extensions of the standards having side extending cleats extending over and holding down the seat, and tension members connecting the pontoons and having intermediate supports carried by the upper parts of the seat standards.

10. A raft comprising two pontoons, a connecting frame having in its lower part two separated bars connected together to make a central opening and extending between the pontoons, fabric strips connecting said bars at each side of a central zone, said strips and bars being separated to form a central opening permitting the passage of a man's head.

11. A knock-down raft comprising two pontoons, a frame connecting said pontoons and comprising a lower horizontal member having its ends resting upon the pontoons, an upper horizontal member forming a seat, and two supporting standards having downward extensions adapted to engage the inner sides of the pontoons and shoulders resting upon the lower horizontal member and also having similar tongues of lesser length at their upper ends and shoulders supporting the seat member, cleats secured to the sides of said upper tongues and projecting over the seat when the latter is in place, the seat and the lower horizontal member of the frame having recesses for the passage of the extensions of the standards, bars resting upon and extending between like ends of the two pontoons, a bar extending lengthwise of and above each pontoon and bearing upon the bottom horizontal member of the frame and upon the bars which rest upon the ends of the pontoons, means for interlocking these longitudinal bars with the parts engaged thereby, and tension members extending between the pontoons and engaging the seat supporting standards to bind the whole together.

12. A knock-down raft comprising two pontoons, a connecting frame comprising a horizontal member extending between and supported upon the central parts of the two pontoons, seat supporting standards supported by said horizontal member, a seat carried by said standards, said frame members having shouldered engagement with each other, other horizontal bars resting upon and connecting the ends of the pontoons, a bar extending longitudinally of and above each pontoon and resting upon each of the frame members which connect the pontoons, and lying against the side faces of the seat supporting standards, said standards having ledges projecting over and bearing upon the upper edges of said longitudinal bars, and means for securing the ends of said longitudinal bars to the transverse bars at the ends of the pontoons and the latter to the pontoons.

In testimony whereof I have hereunto affixed my signature this 13th day of October, 1914.

JAMES H. MAXWELL.

Witnesses:
PENROSE P. McELWAIN,
HENRY L. REYNOLDS.

Copies of this patent may be obtained for five cents each, by addressing the "Commissioner of Patents, Washington, D. C."